(12) United States Patent
Huang et al.

(10) Patent No.: US 7,861,070 B2
(45) Date of Patent: Dec. 28, 2010

(54) TRACE COMPRESSION METHOD FOR DEBUG AND TRACE INTERFACE WHEREIN DIFFERENCES OF REGISTER CONTENTS BETWEEN LOGICALLY ADJACENT REGISTERS ARE PACKED AND INCREASES OF PROGRAM COUNTER ADDRESSES ARE CATEGORIZED

(75) Inventors: Chih Tsun Huang, Hsinchu (TW); Yen Ju Ho, Taipei (TW); Ming Chang Hsieh, Taoyuan County (TW)

(73) Assignee: National Tsing Hua University, Hsinchu (TW)

( * ) Notice: Subject to any disclaimer, the term of this patent is extended or adjusted under 35 U.S.C. 154(b) by 387 days.

(21) Appl. No.: 12/138,226

(22) Filed: Jun. 12, 2008

(65) Prior Publication Data
US 2009/0313460 A1    Dec. 17, 2009

(51) Int. Cl.
G06F 11/22    (2006.01)
(52) U.S. Cl. ...................... 712/227; 717/128
(58) Field of Classification Search ........................ None
See application file for complete search history.

(56) References Cited

U.S. PATENT DOCUMENTS

| | | | | |
|---|---|---|---|---|
| 5,724,505 A * | 3/1998 | Argade et al. | ................. | 714/45 |
| 5,964,842 A * | 10/1999 | Packard | ....................... | 709/247 |
| 6,038,660 A * | 3/2000 | Singh et al. | ................. | 712/230 |
| 6,185,732 B1 * | 2/2001 | Mann et al. | ................. | 717/128 |
| 6,507,921 B1 * | 1/2003 | Buser et al. | ................... | 714/45 |
| 6,530,047 B1 * | 3/2003 | Edwards et al. | ............ | 714/724 |
| 6,615,370 B1 * | 9/2003 | Edwards et al. | ............... | 714/45 |
| 6,708,326 B1 * | 3/2004 | Bhattacarya | ................. | 717/124 |
| 2001/0054175 A1 * | 12/2001 | Watanabe | ....................... | 717/4 |
| 2002/0098603 A1 * | 7/2002 | Mayer | ......................... | 438/14 |
| 2002/0131505 A1 * | 9/2002 | Vidunas | ................. | 375/240.19 |
| 2004/0003212 A1 * | 1/2004 | Mitsuishi et al. | ............ | 712/229 |
| 2004/0078690 A1 * | 4/2004 | Kohashi | ...................... | 714/38 |

(Continued)

OTHER PUBLICATIONS

Kao et al. (A Hardware Approach to Real-Time Program Trace Compression for Embedded Processors); Circuits and Systems I: Regular Papers, IEEE Transactions on; Issue Date: Mar. 2007 ; vol. 54 Issue:3 ; on pp. 530-543.*

(Continued)

*Primary Examiner*—Eddie P Chan
*Assistant Examiner*—Keith Vicary
(74) *Attorney, Agent, or Firm*—WPAT, P.C.; Anthony King

(57) ABSTRACT

The present invention proposed a trace compression method for a debug and trace interface of a microprocessor, in which the debug and trace interface is associated with a plurality of registers for storing data. The trace compression method comprises the steps of: (1) finding register content of each of the registers in a first cycle and register content of each of the registers in a second cycle, in which the second cycle is next to the first cycle; (2) calculating difference of the register content of each of the registers in the second cycle and the register content of each of the registers in the first cycle; and (3) packing the differences of the register contents into data trace packets, in which the differences of the register contents of adjacent registers are condensed into a single data trace packet when the differences of the register contents of the adjacent registers are zeroes.

12 Claims, 6 Drawing Sheets

U.S. PATENT DOCUMENTS

| | | | |
|---|---|---|---|
| 2004/0103399 A1* | 5/2004 | Agarwala et al. | 717/128 |
| 2005/0108689 A1* | 5/2005 | Hooper et al. | 717/135 |
| 2006/0212761 A1* | 9/2006 | Levine et al. | 714/45 |
| 2006/0255972 A1* | 11/2006 | Swoboda | 341/50 |
| 2008/0046699 A1* | 2/2008 | Pauw et al. | 712/227 |
| 2008/0155353 A1* | 6/2008 | Craske | 714/45 |

OTHER PUBLICATIONS

Agarwal et al. (Blocking: exploiting spatial locality for trace compaction); ACM SIGMETRICS Performance Evaluation Review; vol. 18, Issue 1 (May 1990); pp. 48-57.*

Hsieh et al. (An Embedded Infrastructure of Debug and Trace Interface for the DSP Platform); Proceedings of the 45th annual Design Automation Conference; SESSION: Securing and debugging embedded systems; pp. 866-871; Jun. 12, 2008.*

Johnson et al. (PDATS Lossless Address Trace Compression for Reducing File Size and Access Time); Computers and Communications, 1994. IEEE 13th Annual International Phoenix Conference on; Issue Date: Apr. 12-15, 1994; On pp. 213-219.*

Miron Abramovici, Paul Bradley, Kumar Dwarakanath, Peter Levin, Gerard Memmi and Dave Miller; "A Reconfigurable Design-for Debug Infrastructure for SoCs"; In Proc. IEEE/ACM Design Automation Conf. (DAC), Jul. 2006; p. 7-12; San Francisco, USA.

"Quartus II—Design Debugging Using the SignalTap II Embedded Logic Analyzer"; Altera Corporation; Dec. 2004.

Ehab Anis and Nicola Nicolici, "On using lossless compression of debug data in embedded logic analysis", In Proc. Int'l Test Conf. (ITC), Oct. 2007, pp. 1-10, Santa Clara.

"AMBA AHB Trace Macrocell (HTM)", ARM Components, Inc. ,2004.

"Embedded Trace Macrocell Architecture Specification", ARM Components, Inc.,2004.

Andrew B. T. Hopkins and Klaus D. McDonald-Maier, "Debug support strategy for systems-on-chips with multiple processor cores", IEEE Trans. On Computers, 55(2):174-184, 2006.

Chung-Fu Kao, Ing-Jer Huang, and Chi-Hung Lin, "An embedded multi-resolution AMBA trace analyzer for microprocessor-based SoC integration", In Proc. IEEE/ACM Design Automation Conf. (DAC), Jun. 2007,pp. 477-482, San Diego.

Chung-Fu Kao, Shyh-Ming Huang, and Ing-Jer Huang, "A hardware approach to real-time program trace compression for embedded processors", IEEE Trans. on Circuits and Systems, 54(3):530-543, 2007.

A. Mayer, H. Siebert, and K. McDonald-Maier, "Debug support, calibration and emulation for multiple processor and powertrain control SoCs", in Proc. Design, Automation, and Test in Europe (Date), Oct. 2005, pp. 148-152, Munich.

Vojin. Živojnovi'c, Juan Martínez, Christian Schläger, and Heinrich Meyr, "DSPstone: A DSP-oriented benchmarking methodology", In Proceedings of Int. Conf. on Signal Proc. Applic. and Technology (ICSPAT'94), Oct. 1994, Dallas.

"ChipScope Pro Software and Cores User Guide", Xilinx Inc., Oct. 2004.

* cited by examiner

| Code | Type |
|------|------|
| 000 | Full Address |
| 001 | Address Offset |
| 010 | Data Packet |
| 011 | Adjacent Zero Data |

FIG. 3

|  | (t-1)-th Cycle | (t)-th Cycle | XOR Result |
|---|---|---|---|
| R0 | 0x32040 | 0x3506 | 0x0702 |
| R1 | 0x21E4 | 0x21E4 | 0x0 |
| R2 | 0x173A | 0x173A | 0x0 |
| R3 | 0x14F8 | 0x14F8 | 0x0 |
| R4 | 0x153C | 0x153C | 0x0 |
| R5 | 0x1540 | 0x1544 | 0x0004 |

Data Trace Packets:

| 1 | 0 1 0 | 1 1 1 0 |
| 0 | 0 0 0 0 0 1 0 |

| 0 | 0 1 1 | 0 0 1 1 |

| 0 | 0 1 0 | 0 1 0 0 |

FIG. 6

ND TRACE INTERFACE WHEREIN
TRACE COMPRESSION METHOD FOR DEBUG AND TRACE INTERFACE WHEREIN DIFFERENCES OF REGISTER CONTENTS BETWEEN LOGICALLY ADJACENT REGISTERS ARE PACKED AND INCREASES OF PROGRAM COUNTER ADDRESSES ARE CATEGORIZED

BACKGROUND OF THE INVENTION (A) Field of the Invention

The present invention relates to a trace compression method for a debug and trace interface of a microprocessor.

(B) Description of the Related Art

The rapid advancement of the semiconductor technology has enabled the ability of fabricating the system-on-chip (SOC) device in a single silicon. Because of the continuously growing complexity of the integration, the design verification has become one of the most severe challenges.

The increasing demand of the pre-silicon design verification makes it an urgent need during the early design stage. Traditional design verification examines the difference among the design specification and various levels of design descriptions, e.g., the register-transfer level (RTL), gate-level, and transistor level, etc. However, multiple microprocessors and digital signal processor (DSP) cores are now commonly integrated in an SOC device. In addition, the continuously shortened time-to-market forces the software developing to start before the hardware comes to a real silicon, even when the design specification is not finalized. Therefore, the traditional system debug technique called In-Circuit-Emulator (ICE) is no longer effective for the modern SOC devices. One of the major issues of traditional debug technique is that system debug and verification becomes very complicated. It involves the hardware architecture, software tool chain, applications, and the integration of all of them. To identify the root of bugs among the modern SOC system is difficult. And the other issue is, the iterative simulation of the entire system is time consuming. Several approaches were proposed for coping with the system debug and trace challenges. Among them, ARM Components, Inc. Embedded Trace Macrocell Architecture Specification, 2004, addressed the tracing of the program address and register content with a comprehensive programmer model. Its extended cross-trigger architecture also supports the debug and trace in the multi-core design environment. In 2005, A. Mayer, H. Siebert, and K. McDonald-Maier presented a Package Sized ICE (PSI) for a Multi-Core Debug Support (MCDS) architecture, providing the flexible triggering without the external emulation box. Standard interfaces was presented by A. B. T. Hopkins and K. D. McDonald-Maier in 2006 to decouple the debug support from processor cores and other active data accessing units, which allows debug support being reused across heterogeneous SOC platforms. In addition, the debug and trace of the on-chip communication is also essential for the SOC verification. A multi-resolution trace analyzer was proposed by C.-F. Kao, I.-J. Huang, and C.-H. Lin in 2007, permitting the dynamic selection among different levels of debug abstraction, trading-off between the trace granularity and trace depth. Besides the address and data inside the processors, internal signals deep inside the system are usually inspected for the design debug.

SUMMARY OF THE INVENTION

The present invention is directed to providing an effective Embedded Infrastructure for Debug and Trace Interface (EI-DETIC) platform. The Eidetic platform has been developed with a proprietary embedded DSP core in an SOC design platform to facilitate the hardware/software (HW/SW) co-verification. With the proposed methodology the debug and trace interface can be optimized with the benchmark evaluation, achieving a high compression rate of the program and data traces. Therefore, the present invention can lower the difficulty of the bug allocation because more information can be monitored effectively, reducing the system debug turn-around time.

The present invention proposed a trace compression method for a debug and trace interface of a microprocessor that may be a DSP, in which the debug and trace interface is associated with a plurality of registers for storing data. The trace compression method comprises the steps of: (1) finding register content of each of the registers in a first cycle and register content of each of the registers in a second cycle, in which the second cycle is next to the first cycle; (2) calculating difference of the register content of each of the registers in the second cycle and the register content of each of the registers in the first cycle; and (3) packing the differences of the register contents into data trace packets, in which the differences of the register contents of adjacent registers are condensed into a single data trace packet when the differences of the register contents of the adjacent registers are zeroes.

In addition to the compression of register contents, the present invention also proposed a method to compress the program counter (PC) sequences. The method comprises the steps of: (1) evaluating increases of program counter addresses in the program counter between every two consecutive cycles; (2) selecting a most common category in the increases of program counter addresses; and (3) condensing the program counter addresses with the increase of the most common category when the increases of the program counter addresses between the consecutive cycles are the same.

The experimental results justify the efficiency and effectiveness of our Eidetic platform for the verification of the SOC device. The area overhead of our approach is about 3% in a realistic embedded DSP subsystem.

BRIEF DESCRIPTION OF THE DRAWINGS

The objectives and advantages of the present invention will become apparent upon reading the following description and upon reference to the accompanying drawings in which:

FIG. 3 illustrates header encoding of the data trace packets in accordance with an embodiment of the present invention;

FIG. 6 illustrates an embodiment of data compression of the present invention.

DETAILED DESCRIPTION OF THE INVENTION

Figure 1:
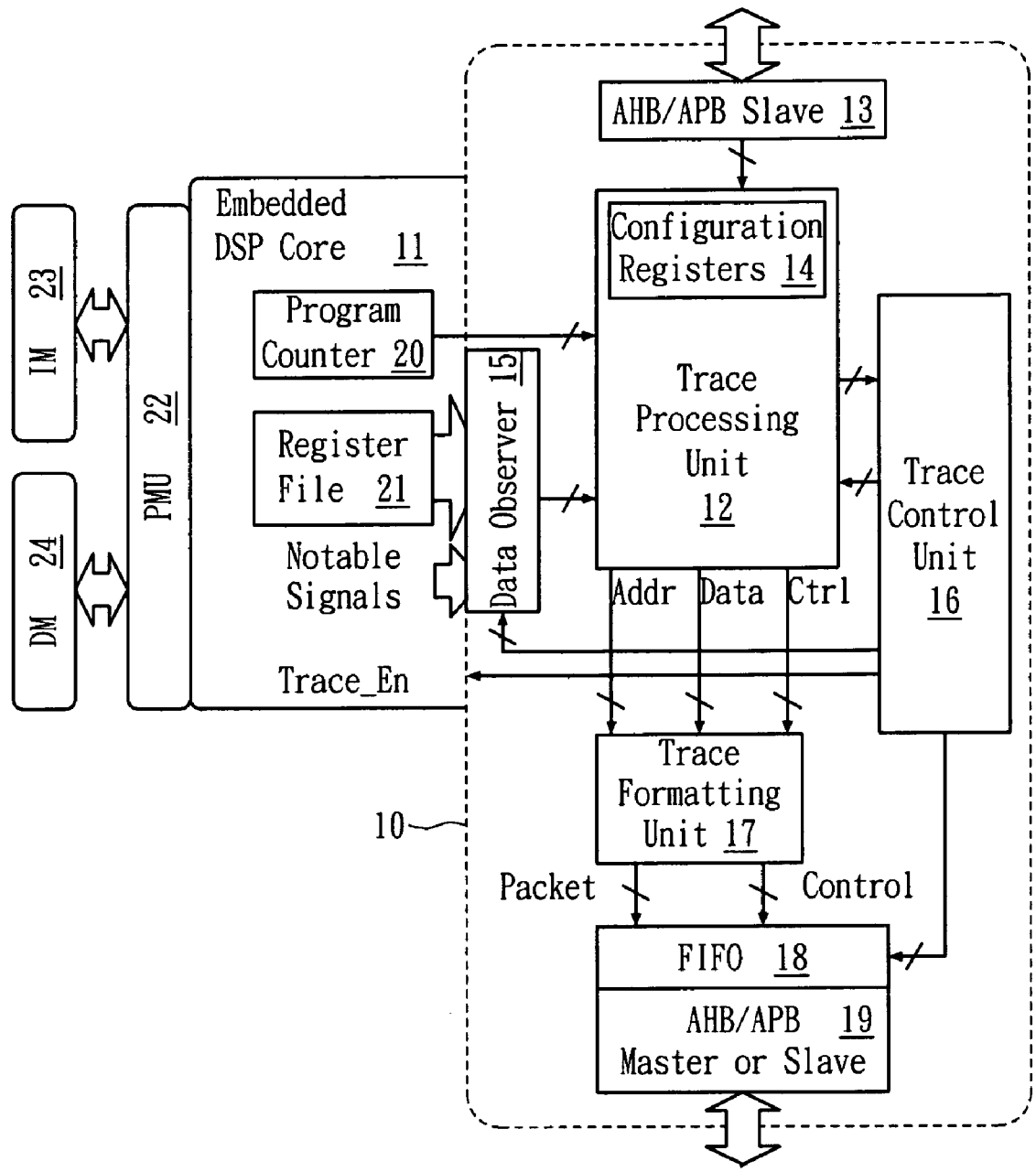
FIG. 1 illustrates the architecture of a debug and trace interface associated with a DSP.

The trace and debug at the software level basically requires the information of the program flow with data content. The former can be verified by examining the value of the Program Counter (PC); while the latter by accessing the content of the register file. FIG. 1 shows architecture of a debug and trace interface 10, which is attached to an embedded DSP core 11 for the readout of the PC 20 and register file 21. In addition to the register file, some notable internal signals of the DSP subsystem can be configured to be traced. The embedded DSP core 11 is coupled to a page management unit (PMU) 22, which is connected to an instruction memory (IM) 23 and a data memory (DM) 24 for receiving instructions and data. The data to be traced is manipulated by a Data Observer 15, while the PC content is directly connected to a Trace Processing Unit (TPU) 12. The user can configure the trace events, including the address ranges, data conditions, and various trace strategies through the Trace Control Port which is an AHB/APB slave interface 13 for this embodiment. And then these user-specified constraints are stored in Configuration Registers 14 of the TPU 12. The TPU 12 also equips with address comparators and data comparators to detect the pre-specified event triggers. The Trace Control Unit (TCU) 16 then manages these triggers and dumps the corresponding PC, register content or the value of the internal signals. The Trace Formatting Unit (TFU) 17 therefore compresses and packs the trace information into byte-oriented packets. Finally, the trace packets are pushed into a First-In First-Out (FIFO) 18, and can be accessed from the Trace Data Port, which is an AHB/APB master or slave interface 19 for this embodiment.

To facilitate the sophisticated trace processing, the DSP core 11 has been carefully designed to accept a trace enable signal from the TCU 16. The signal can pause the DSP core 11 when necessary, allowing multi-cycle trace processing. Therefore the trace of a single cycle can be done in multiple trace cycles without affecting the execution result. The limitation of using the trace enable signal is that, for system-level verification involving multiple processor cores asynchronously, the realistic behavior of the normal function may not match with the behavior under trace, because the Debug and Trace Interface may introduce additional cycle overhead. However, such issue should be solved using a higher level debug/trace technique which deals with the asynchronous interaction among different cores, which is beyond the scope of this invention.

The area overhead of the Debug and Trace Interface 10 mainly comes from the TPU 12, which comprises address comparators and data comparators, and determines the number of the registers to be traced at once. There are 46 registers in the proprietary DSP core 11. After the trade-off between trace efficiency and cost, the Debug and Trace Interface 10 is implemented to capture 32 registers at most, including 8 general purpose registers, 8 address calculation registers, 12 DAG (Data Access Generating) registers and 4 selected system registers. Form the profiling statistics, other registers are either merely used or can be observed at a higher level easily.

During the HW/SW co-verification using our FPGA (Field Programmable Gate Array) prototype, the user can reconfigure the Debug and Trace Interface 10 to increase, decrease, or even exchange the target registers to be traced since the selection of the target registers is flexible and affordable on the FPGA. When entering the design hardening phase (e.g., chip fabrication), the selection of the target registers can be optimized based on previous debug/trace experience and the system evaluation.

When encountering a bug, detailed debugging will be deployed. Usually a software related bug relies on the trace of the program flow and register content. For a hardware related bug, the designer often traces down to the transition of the notable internal signals. Therefore, the Data Observer 15 is also capable of capturing the predefined internal signals. These user-specified signals can be the memory access data or control signals along the DSP core boundary, control signals to the internal function units (e.g., the DAG, MAC (Multiply-Accumulator), video related function block, etc.), or control signals to various kinds of registers.

Program Trace Compression

In practice, the amount of the trace information is huge. So efficient compression techniques are needed both for program trace and data trace. The common compression method is the differential-based technique, either by subtracting or XORing the current data value from the previous one to minimize the effective data to be stored.

Figure 2:
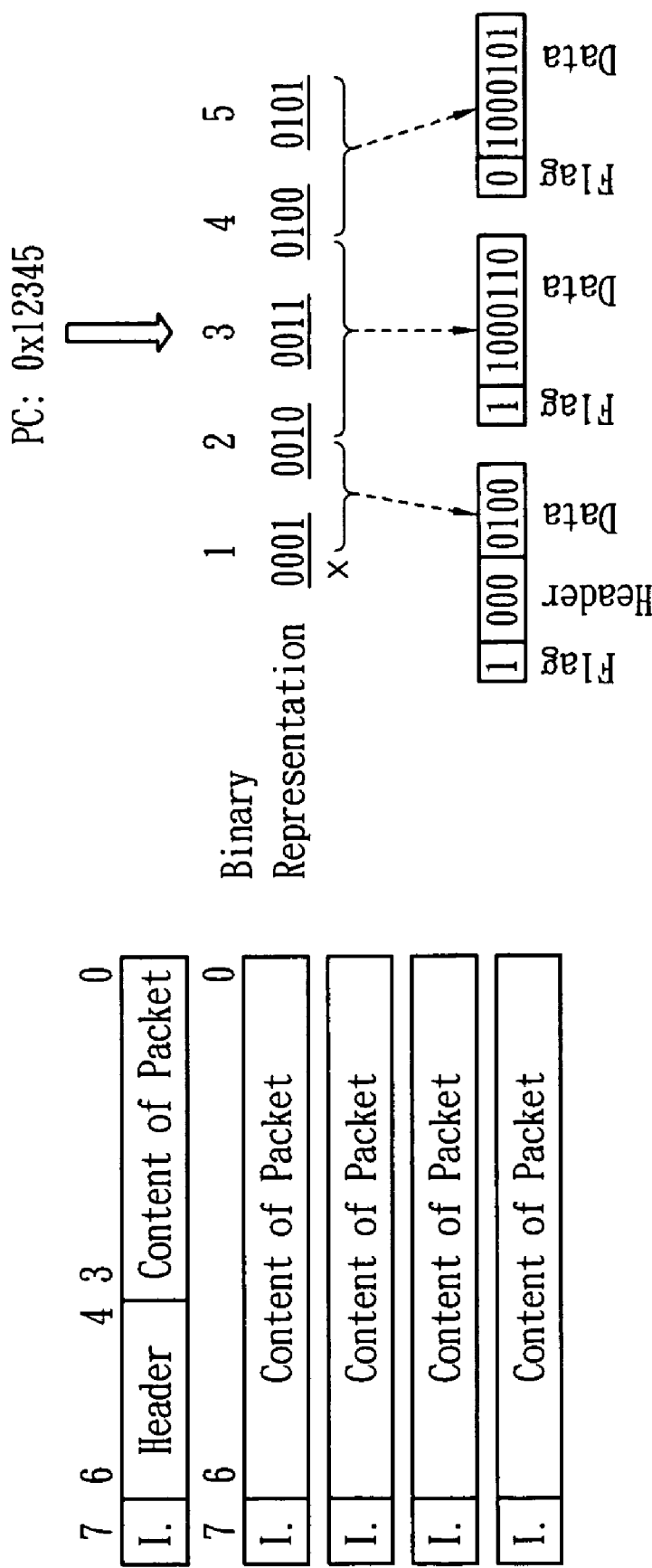
FIG. 2 illustrates a packet format in accordance with an embodiment of the present invention.

In an embodiment, the program trace adopts XOR differential-based technique. In addition, the leading zero of the 32-bit XORed PC value will be removed before packing byte-oriented trace packets, as shown in FIG. 2. Each packet consists of at most 5 bytes for a 32-bit value, with a header field in the first byte. And the most significant bit of each byte, called Incomplete flag, indicates whether the packet is complete (0) or not (1). For example, the address difference 0x12345 can be packed into three bytes. As shown in FIG. 3, there are two types of headers for the address tracing: the address offset by using the differential-based compression and the full address without the XOR compression. The rest two headers in the table are for the data tracing.

One of the PC compression techniques is to ignore the program trace packet if the PC is monotonically increasing. Only the discontinuous address sequence is recorded. For instance, when the PC keeps increasing by an offset of 4, all the program trace packets except the first one can be eliminated. Decompression is easy to look up the assembly code with the information that no branch occurs.

Figure 4:
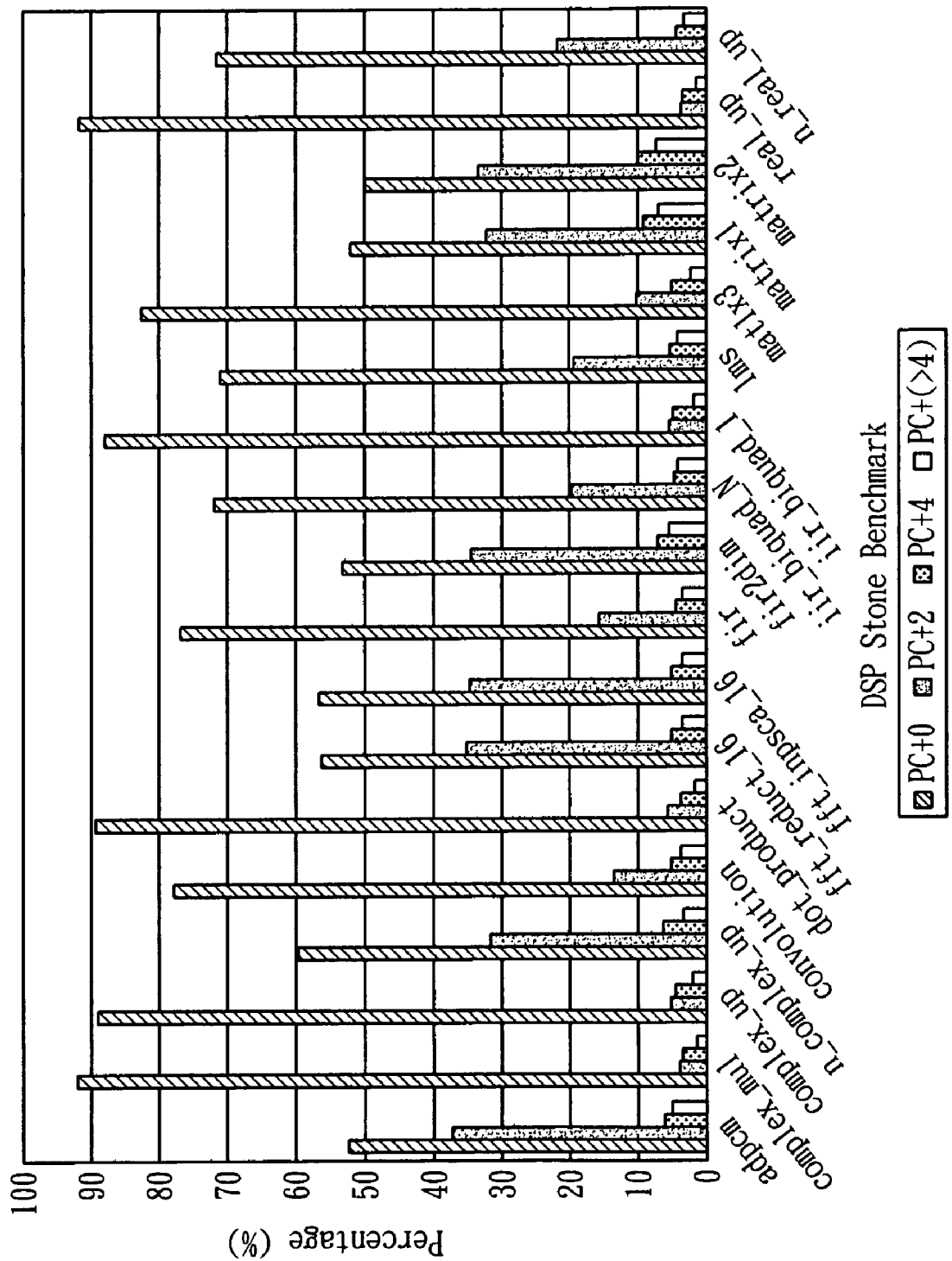
FIG. 4 illustrates profiling of program counter sequences in accordance with an embodiment of the present invention.

In this embodiment, the DSP core 11, with a modern DSP architecture, supports self-loop instruction that can execute plenty of cycles itself. In addition, the processor can be executed in a mixture of the 32-bit and 16-bit instructions, therefore the PC value can be increased by 4 or by 2 for the continuous address sequence. For a better efficiency, we evaluated 18 DSPstone benchmarks using the cycle-accurate ISS (Instruction Set Simulator). The benchmarks are also for the realistic design verification by software application, hardware design, and system integration teams. All the program are compiled at the C level, and can be executed on the prototype platform. The first observation is that in these benchmarks a large portion of the address difference is zero between two consecutive cycles (see FIG. 4). In FIG. 4, "PC+0" indicates the cases of zero address difference, while "PC+2" and "PC+4" for the addresses increased by 2 and by 4, respectively. The last category, "PC+>4" denotes the rest cases when a branch or jump occurs.

Figure 5:
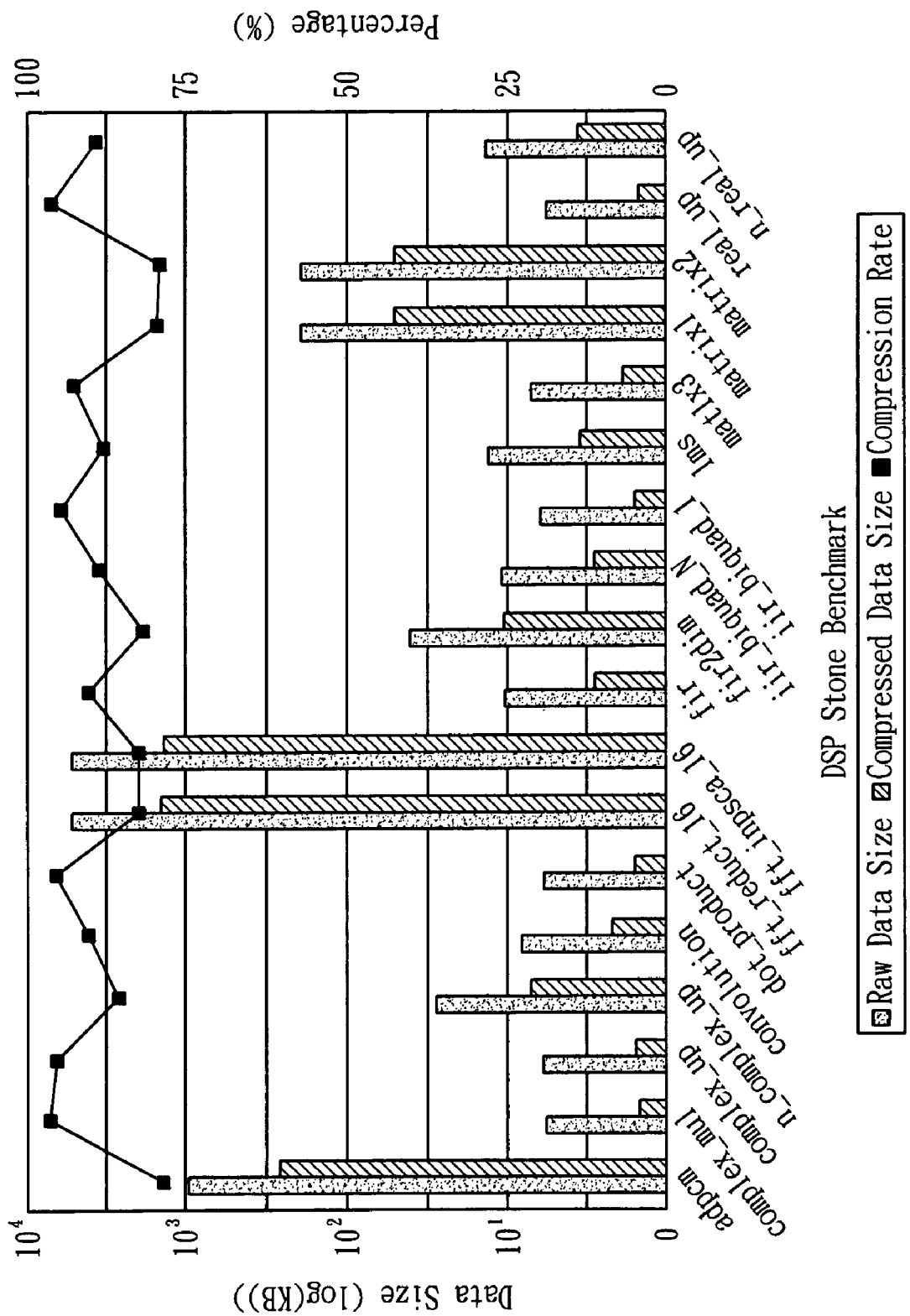
FIG. 5 illustrates comparison of the program trace compression in accordance with an embodiment of the present invention.

Based on the evaluation, we adopt the approach to ignore the program trace packets when the consecutive PC values are the same (i.e., the most common category). FIG. 5 summarizes the raw data size of the program trace without compression and the compressed data size for the 18 benchmarks. Note that the y-axis is a logarithm axis in FIG. 5. The compression rate ranges from 78.8% to 96.81%, (on average 88.34%). The compression rate is defined as the higher the better. The selection of the category to be condensed can be determined based on the profiling for the real applications.

Data Trace Compression

Traditional data trace requires the explicit selection of one or more specific registers to be traced before the execution, which is considered inefficient for either hardware or software designer practically. Therefore the efficient trace approach should monitor all or most of the register contents to minimize the debug effort. So for the design co-verification, the trace data compression is crucial to maximize the trace data capability, alleviating the manual effort involved. The register file architecture of the modern processor can be centralized or distributed, however, the write ports of the entire register file is limited. For instance, under the architecture of the DSP core 11, at most seven registers can be changed at a single cycle. Based on this kind of architecture property, this invention presents a compression technique to condense the data trace packet of adjacent registers when they are identical themselves between consecutive cycles. FIG. 6 shows an example for the register contents of registers R0-R5 from the (t−1)-th cycle to (t)-th cycle. After the XOR operations, the difference of R0, 0x702 is packed into 2 bytes. The four adjacent zeroes for R1-R4 are condensed into a single packet with Adjacent Zero Data header (011), where the 4 least significant bits 0011 denotes there are 4 adjacent registers being packed. The packet format supports at most 16 adjacent zeroes packing in one byte. Finally, the difference of R5 (0x0004) can be packed into one byte.

Based on the specific write-port property of the register file, the original raw data size and the compressed data size with the compression rate are compared. The average compression rate is 97.5%, justifying the proposed compression technique. The approach of the present invention is simple and efficient, and also applicable for other DSP cores, microcontrollers or microprocessors.

The above-described embodiments of the present invention are intended to be illustrative only. Numerous alternative embodiments may be devised by those skilled in the art without departing from the scope of the following claims.

What is claimed is:

1. A trace compression method for a debug and trace interface of a microprocessor, the debug and trace interface being associated with a plurality of registers for storing data, the trace compression method comprising the steps of:
monitoring register content of each of the registers in a first cycle and register content of each of the registers in a second cycle, wherein the second cycle is immediately consecutive to the first cycle;
calculating respective differences in the register content between each of the registers in the second cycle and each of the registers in the first cycle; and
packing the differences of the register contents into data trace packets, wherein the differences of the register contents of logically adjacent registers are condensed into a single data trace packet when the differences of the register contents of the logically adjacent registers are zeroes.

2. The trace compression method of claim 1, wherein the difference is calculated by subtraction or exclusive OR (XOR) operation.

3. The trace compression method of claim 1, wherein each of the data trace packets comprises a flag, a header and a content of the data trace packet.

4. The trace compression method of claim 3, wherein the header indicates whether logically adjacent registers are packed into a single data trace packet.

5. The trace compression method of claim 3, wherein the flag, the header and the content of the data trace packet are stored in a byte, and the flag indicates whether further content of the data trace packet is stored in another byte.

6. The trace compression method of claim 1, wherein the debug and trace interface is further associated with a program counter, the trace compression method further comprising the steps of:
categorizing increases and lack of changes of program counter addresses in the program counter between every two consecutive cycles based upon the magnitudes of the increases, if any, of the program counter addresses;
determining a most common category based on the categorizing; and
condensing the increases or lack of changes of program counter addresses corresponding to the most common category when the increases or lack of changes of the program counter addresses corresponding to the most common category occur between the consecutive cycles.

7. The trace compression method of claim 6, further comprising a step of packing the program counter addresses into program trace packets.

8. The trace compression method of claim 7, wherein the step of condensing the increases or lack of changes of program counter addresses corresponding to the most common category is performed by ignoring the program trace packets.

9. A trace compression method for a debug and trace interface of a microprocessor, the debug and trace interface being associated with a program counter, the trace compression method comprising the steps of:
categorizing increases and lack of changes of program counter addresses in the program counter between every two consecutive cycles based upon the magnitudes of the increases, if any, of the program counter addresses;
determining a most common category based on the categorizing; and
condensing the increases or lack of changes of program counter addresses corresponding to the most common category when the increases or lack of changes of the program counter addresses corresponding to the most common category occur between the consecutive cycles.

10. The trace compression method of claim 9, wherein the most common category is determined by determining the category containing a larger portion of increases or lack of changes of the program counter addresses in comparison with the other categories.

11. The trace compression method of claim 9, further comprising a step of packing the program counter addresses into program trace packets.

12. The trace compression method of claim 11, wherein the step of condensing the increases or lack of changes of program counter addresses corresponding to the most common category is performed by ignoring the program trace packets.

* * * * *